US012006147B2

(12) United States Patent
Becker et al.

(10) Patent No.: US 12,006,147 B2
(45) Date of Patent: Jun. 11, 2024

(54) BLOCK STORAGE ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Timm Morawietz, Tholey-Überroth (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 18/115,932

(22) Filed: Mar. 1, 2023

(65) Prior Publication Data

US 2023/0278791 A1 Sep. 7, 2023

(30) Foreign Application Priority Data

Mar. 3, 2022 (EP) .................................... 22160003

(51) Int. Cl.
*B65G 1/04* (2006.01)
*B65G 1/14* (2006.01)
*B65G 57/30* (2006.01)
*B65G 59/06* (2006.01)

(52) U.S. Cl.
CPC ......... *B65G 1/0471* (2013.01); *B65G 1/0414* (2013.01); *B65G 1/0421* (2013.01); *B65G 1/14* (2013.01); *B65G 57/30* (2013.01); *B65G 59/06* (2013.01); *B65G 2201/0235* (2013.01)

(58) Field of Classification Search
CPC .. B65G 1/0471; B65G 1/0414; B65G 1/0421; B65G 1/14; B65G 57/30; B65G 59/06; B65G 2201/0235; B65G 57/302; B66F 9/06; B66F 9/07
See application file for complete search history.

(56) References Cited

U.S. PATENT DOCUMENTS

| 5,147,176 | A | 9/1992 | Stolzer |
| 2005/0053450 | A1* | 3/2005 | Kantola ............... B65G 1/0407 |
| | | | 414/273 |
| 2019/0225436 | A1* | 7/2019 | Lindbo ............... B65G 1/0464 |
| 2020/0346864 | A1* | 11/2020 | Fjeldheim .............. B65G 1/065 |
| 2022/0063916 | A1 | 3/2022 | Becker et al. |

FOREIGN PATENT DOCUMENTS

| EP | 3 960 657 A1 | 3/2022 |
| JP | S5244976 A | 4/1977 |
| WO | 2019/101366 A1 | 5/2019 |
| WO | 2021/259821 A1 | 12/2021 |

OTHER PUBLICATIONS

Extended European Search Report issued in EP Patent Application No. 22160003.4, dated Sep. 2, 2022.

* cited by examiner

*Primary Examiner* — Lynn E Schwenning
(74) *Attorney, Agent, or Firm* — GREENBLUM & BERNSTEIN, P.L.C.

(57) ABSTRACT

A block storage arrangement that includes a plurality of container stacking spaces, a loading space arranged below the container stacking spaces, and at least one loading vehicle which is movable in the loading space and has a lifting arrangement, with which containers can be loaded from below into a container stacking space and can be removed from below from the container stacking space. It would be desirable to enable a high productivity of the block storage arrangement. For this purpose, the lifting arrangement includes at least two lifting units that can be actuated independently of one another.

8 Claims, 3 Drawing Sheets

BLOCK STORAGE ARRANGEMENT

CROSS-REFERENCE TO RELATED APPLICATION

This application claims priority under 35 U.S.C. 119(a) to Europe Application No. 22160003.4, filed Mar. 3, 2022, the disclosure of which is expressly incorporated by reference herein in its entirety.

BACKGROUND

1. Field of the Invention

The present invention relates to a block storage arrangement having several container stacking spaces, a loading space arranged below the container stacking spaces, and at least one loading vehicle which is movable in the loading space and has a lifting arrangement, with which containers can be loaded from below into a container stacking space and can be removed from below from the container stacking space.

2. Discussion of Background Information

In such a block storage arrangement, containers are stored in the form of container stacks. Because the containers are situated directly on top of each other in a container stack, a very high container density can be achieved in the direction of gravity, and an available installation space can thus be utilized very well. The container stacking spaces can likewise be arranged to be relatively closely adjacent. Accordingly, a high container density can also be achieved transverse to the direction of gravity.

For loading a container into a container stacking space, a container is moved with the aid of the loading vehicle into a position below the desired container stacking space. The lifting arrangement then lifts the container until it is inserted into the container stacking space. If other containers are already located in the container stacking space, these containers are lifted by the container that is to be newly stored. The newly stored container then forms the lowermost container of a container stack. The lowermost container of a stack is held by a holding device. The loading vehicle can then be moved again to another position. To remove a container from the container stacking space, the loading vehicle is again positioned below the container stacking space. The lifting arrangement is actuated in order to lift the respective lowest container of the container stack located in the container stacking space. The container is thereby released from the holding device. The container stack can be lowered, wherein the holding device becomes active again in order to hold the containers which are not to be removed from the container stacking space. If the container has been lowered far enough on the loading vehicle, the loading vehicle can be moved again in order to move the container out of the loading space, for example.

In many cases, the desired container is not the lowermost container of a container stack. In this case, it is necessary to relocate the containers that are not required, i.e., to remove containers from the respective container stacking space and accommodate them in another container stacking space, until the desired container is available. This costs a certain amount of time and affects the productivity of the block storage arrangement in an unfavorable manner.

SUMMARY

An object of the invention is to enable a high productivity of a block storage arrangement.

This object is achieved in a block storage arrangement of the type mentioned at the outset by the lifting arrangement having at least two lifting units, or lifters, which can be operated independently of one another.

The loading vehicle can therefore insert not just one container into a container stacking space from below or remove it from below, but, instead, the loading vehicle can load two containers into container stacking spaces at the same time, or at least within a short period of time, or remove two containers therefrom. However, both lifting units do not have to be actuated simultaneously. For example, a container can be removed from a container stacking space, wherein only one lifting unit is active. If this container has then been lowered sufficiently, the loading vehicle is moved only far enough that the other lifting unit is positioned below the container stacking space. The other lifting unit can then remove a further container. The two containers can then be moved together to another container stacking space, so that driving time of the loading vehicle is saved when restacking or relocating containers.

Preferably, a control device, or controller, is connected to the lifting units, wherein the control device has a synchronous device, or synchronizer. In this way, it is also possible to raise the two lifting units simultaneously. This is particularly advantageous when oversized containers are used in the block storage arrangement. Such containers can then be lifted together by both lifting, units without losing their orientation perpendicular to the direction of gravity. The containers can therefore still be held, horizontally.

A container holding device, or container holder, is preferably arranged between each container stacking space and the loading space, wherein the loading vehicle, for each lifting unit, or lifter, has an actuating arrangement, or actuator, acting on the container holding device. The loading vehicle is thus able to open the container holding device separately for each container stacking space. In this way, the loading; and removal of containers for each container stacking space can be controlled individually.

Preferably, each actuating arrangement has at least one beam which is movable in a direction from the loading, space to a container stacking space, the beam having two actuators arranged at a distance from one another. These actuators are then moved jointly by the beam, so that they can simultaneously actuate different elements of the container device, in order to open the container holding device. Another synchronization of this opening movement is not necessary. The beam is a relatively simple design solution.

Preferably, the beam has a top side and a bottom side, wherein a distance between the top side and the bottom side varies over the length of the beam. The top side is located at the top in the direction of gravity, and the bottom side is located at the bottom in the direction of gravity. If the distance changes, the beam can have, for example, a horizontally extending top side and an inclined bottom side. The mass of the beam can thus be kept small.

Preferably, each actuating arrangement is arranged on an end wall element of the loading vehicle. A drive for the actuating arrangement can then also be provided on the end wall element. The actuating arrangement then projects away from the end wall element in the direction towards the other end of the loading vehicle, i.e., in the direction of another end wall element. The installation space required for the loading vehicle can thus be kept small.

Preferably, each container stacking space has a center axis, and the lifting units, each have a center point in a plane perpendicular to the direction of gravity, wherein a distance between the center points of the lifting units corresponds to a distance between the center axes. If the loading vehicle is positioned such that a lifting unit is located exactly below a container stacking space, then the other lifting unit of the loading vehicle is also exactly below another container stacking space. In this way, simultaneous loading or emptying of two container stacking spaces arranged adjacent to each other is possible.

Preferably, the lifting unit has a container receiving space which is rectangular in plan view and has a longitudinal side and a transverse side, which is shorter than the longitudinal side, wherein the longitudinal sides of adjacent container receiving spaces are arranged adjacent to one another. The containers are then received with their longer longitudinal sides parallel to one another in the loading vehicle. The length of the loading vehicle can then be kept short.

Preferably, a frame arrangement, or frame, is arranged between the loading space and the container stacking spaces, wherein adjacent container receiving spaces are at a distance from one another which is at least as large as a thickness of the frame arrangement on the longitudinal sides. Two containers can thus be stored simultaneously in the container stacking spaces. The containers are then guided past the frame arrangement.

Preferably, several similar containers are arranged in the container stacking spaces, wherein the container receiving spaces are of a height which corresponds to the height of at least two containers stacked on top of one another. The loading vehicle can thus pick up and transport two containers stacked on top of each other. The loading, space is of a corresponding height. Because the loading vehicle already has two lifting units, the loading vehicle can then take up a total of four (with a stack height of two containers) or more containers, so that transport times when restacking or relocating containers can be kept low, and the productivity of the block storage arrangement can be enhanced. When removing containers from the block storage arrangement or when loading containers in the block storage arrangement, the simultaneous handling of more than two containers can also have advantages with regard to the time required.

BRIEF DESCRIPTION OF THE DRAWINGS

The invention is described below with reference to a preferred exemplary embodiment in conjunction with the drawing. The following are shown therein.

DETAILED DESCRIPTION

Figure 1:
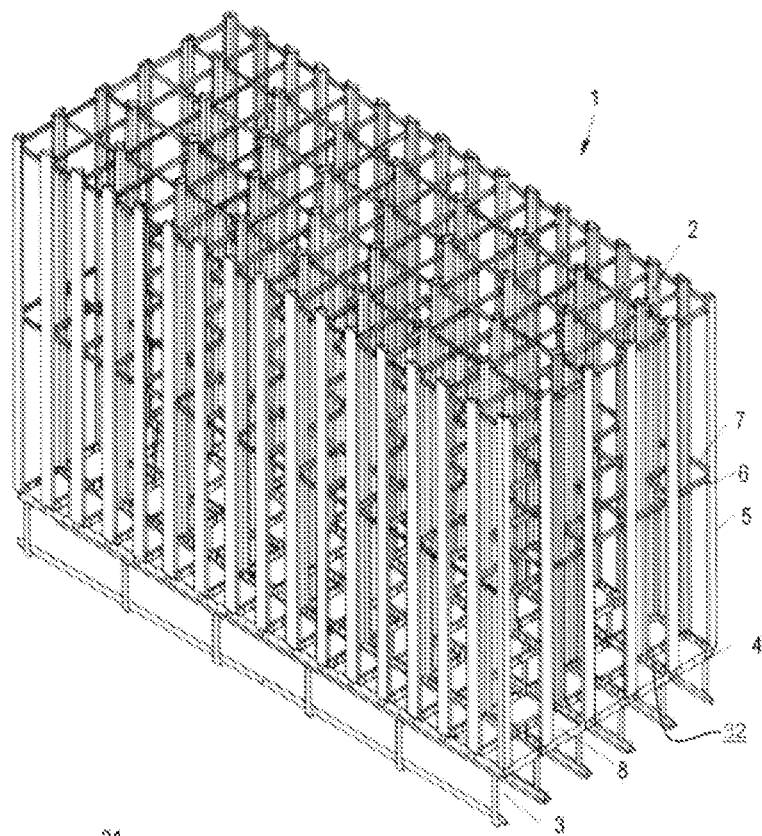
FIG. 1 a schematic representation of a block storage arrangement.

FIG. 1 shows, in highly schematic fashion, a block storage arrangement 1, which can also be referred to as a stack storage arrangement. The block storage arrangement 1 has several container stacking spaces 2 and a loading space 3, which is arranged below the container stacking spaces 2. A frame arrangement 4 is arranged between the container stacking spaces 2 and the loading space 3. Stands 5 are arranged on the frame arrangement 4 and are connected to one another at a distance from the frame arrangement 4 by transverse braces 6 and longitudinal braces 7.

For each container stacking space 2, the frame arrangement 4 has an opening 8 through which the container stacking space 2 is connected to the loading space 3. A holding device 32, or container holder, is arranged in each opening 8 (in a manner not shown in detail), with which holder a container 9 (FIGS. 3 and 4) can be held in the container stacking space 2.

The block storage arrangement 1 is loaded from below, i.e., a container 9 is moved through the loading space 3 into a position which is located below a container stacking space 2. The container 9 is then introduced from below into the container stacking space 2, in that the container is raised. The container 9 is then held by the holding device arranged in the opening 8, so that the container is located at a sufficient distance from the base of the loading space 3. If a container or a stack of containers is already located in the container stacking space 2, then the stack is lifted, and the newly loaded container 9 then forms the lowermost container 9 of this stack.

The removal of a container 9 from a container stacking space proceeds in the reverse direction. The lowermost container 9 of a container stack is raised until it comes loose from the holding device in the opening 8. Thereafter, the container 9—possibly with several containers located thereon—can be lowered, wherein the holding device can then hold the next container or the one after it (which process will be described in more detail further below), so that only the lowermost container 9 or the two lowermost containers is/are removed from the container stacking space 2. The removed container 9 is then moved out of the loading space 3 in order to be able to handle it further.

Figure 2:
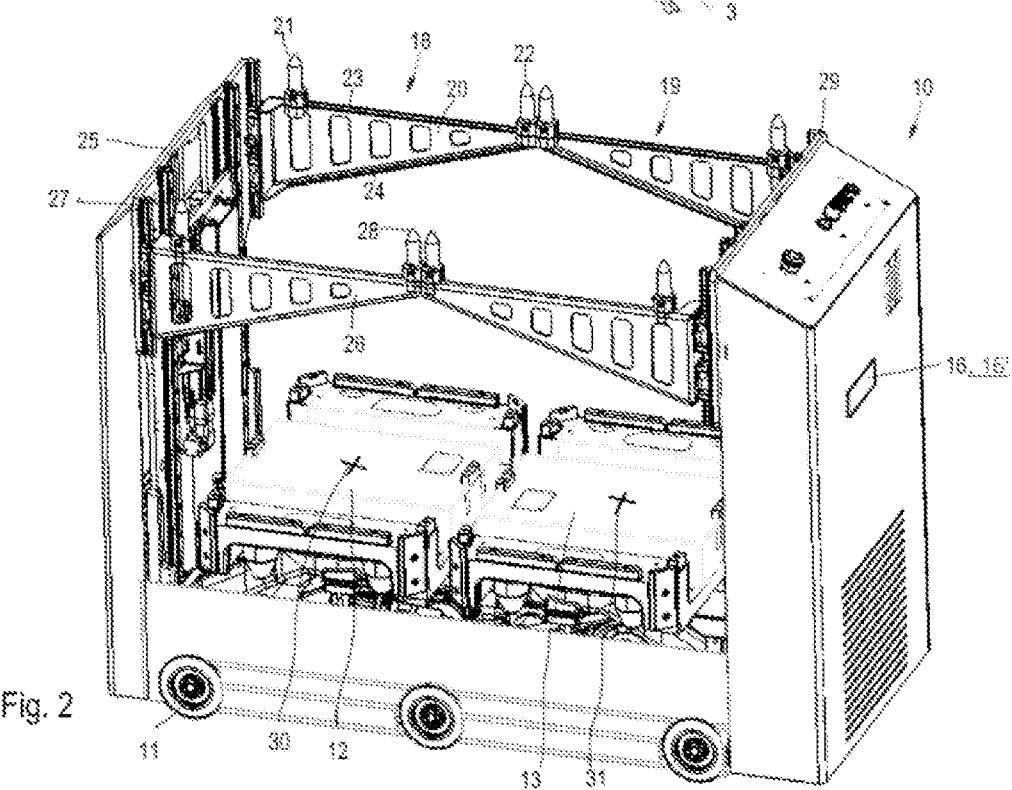
FIG. 2 a loading vehicle.

The handling of the container 9 in the loading space 3, i.e., the movement of the container 9 into the desired position below the container stacking space 2, is accomplished with the aid of a loading vehicle 10 shown in FIG. 2. The loading vehicle 10 has several wheels 11 with which it can be moved on the floor of the loading space 3. Further wheels (not shown in greater detail) can be provided in order to be able to move the loading vehicle 10 not only in a single direction, but also transversely to this single direction.

The loading vehicle 10 has two lifting units 12, 13, which can be operated independently of one another. In order to simplify the following explanation, a container receiving space in which a container 9 can be arranged is defined above each lifting unit 12, 13. The container receiving space does not have to be physically limited. In the lowered state of the lifting units 12, 13, however, the container receiving spaces are located within the loading vehicle 10.

Figure 3:
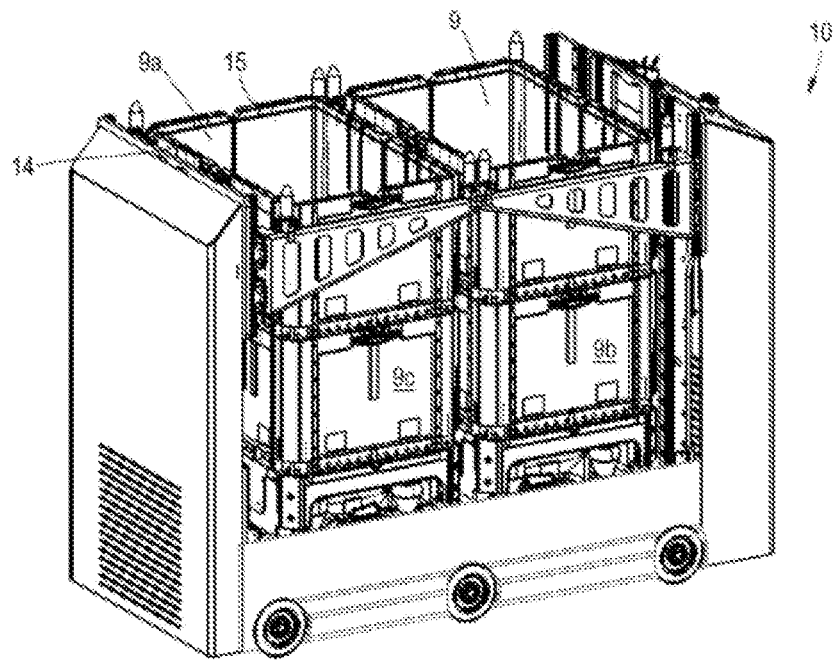
FIG. 3 a loading vehicle with several containers.
Figure 4:
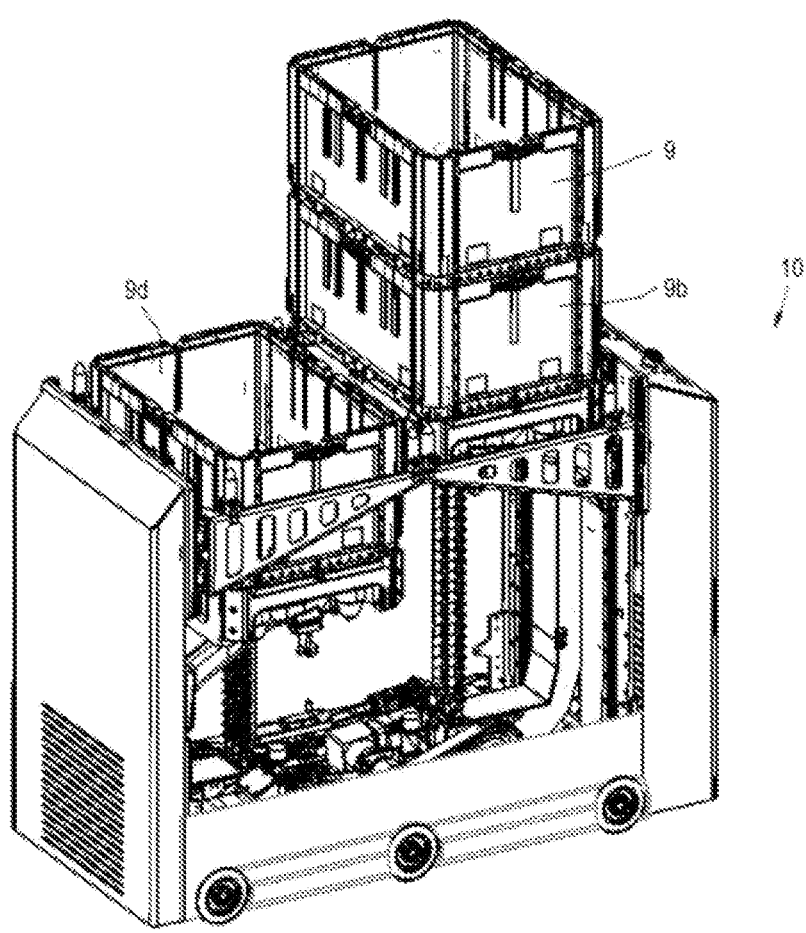
FIG. 4 the loading vehicle with the containers in a partially raised position.
Figure 5:
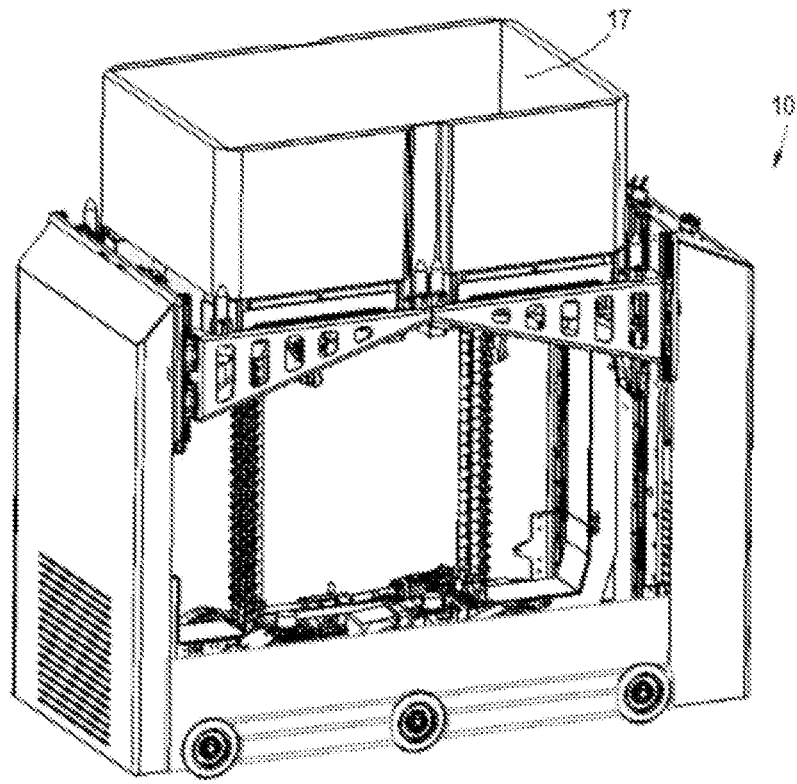
FIG. 5 the loading vehicle with a large container in the raised position.
Figure 6:
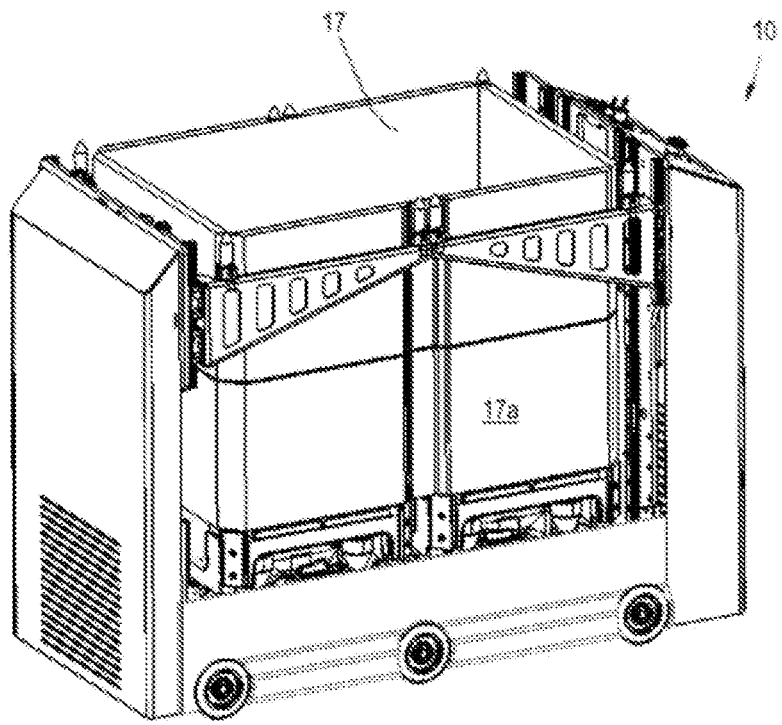
FIG. 6 the loading vehicle with two large containers in the lowered position.

As can be seen from FIGS. 3 and 4, each container receiving space has a longitudinal side, which corresponds to a longitudinal side 14 of a container 9, and a transverse side, which corresponds to a transverse side 15 of the container 9. The longitudinal side 14 is longer than the transverse side 15. The longitudinal sides 14 of the containers 9 are arranged parallel to one another in the loading vehicle 10. Accordingly, the container receiving spaces also have a longitudinal side and a transverse side, wherein the transverse side is shorter than the longitudinal side, and the longitudinal sides of adjacent container receiving spaces, and thus the longitudinal sides of adjacent lilting units 12, 1.3, are arranged adjacent to one another.

The loading vehicle has a control device 16, or controller, which is connected to the lifting units 12, 13, or lifters. The control device 16 has a synchronizing device 16' or synchronizer, so that the lifting units 12, 13 can be moved not just independently of one another, i.e., can be raised or lowered independently of one another, but can also be raised and lowered together. It is thus possible, for example, to handle a container 17, which is approximately twice the size of a container 9, with the loading vehicle 10, wherein the block storage arrangement 1 is then provided with correspondingly large container receiving spaces 2 (not shown).

As mentioned above, a container holding device is arranged in the opening 8 (or elsewhere) between each container stacking space 2 and the loading space 3. For each lifting unit 12, 13, the loading vehicle 10 has an actuating arrangement 18, 19 acting on the container holding device. The actuating arrangement 18 has a beam 20 on which two actuators 21, 22 arranged at a distance from one another are arranged. The beam 18 has a top side 23 and a bottom side 24, wherein a distance between the top side 23 and the bottom side 24 varies over the length of the beam 20. The actuating unit 18 is arranged on an end wall element 25 of the loading vehicle 10. The beam 20 tapers away from the end wall element 25.

The actuating arrangement 18 has a second beam 2 with actuators 27, 28, wherein the second beam 26 is designed in the same way as the first beam 20.

The second actuating arrangement 19 is constructed in the same way as the first actuating arrangement 18, but, with respect to the first actuating arrangement 18, in a mirror-inverted manner. The second actuating arrangement 19 is arranged on a second end wall element 29 of the loading vehicle 10.

Each container stacking space 2 has a central axis. The central axis of a container stacking space 2 is arranged where the diagonals of the opening 8 intersect. The lifting units 12, 13 each have a center point 30, 31 in a plane perpendicular to the direction of gravity, wherein a distance between the center points 30, 31 of the lifting unit corresponds to a distance between the central axes.

Thus, if the loading vehicle 10 is positioned in the loading space 3 such that a lifting unit 12 is located exactly below a container stacking space 2, then the lifting unit 13 is located exactly below an adjacent container stacking space 2, so that two containers 9 can simultaneously be loaded m adjacent container stacking spaces 2 or can be removed from adjacent container stacking spaces 2.

The lifting units 12, 13 are at a certain distance from one another. Accordingly, the container receiving spaces are also at a distance from one another, which can be seen, for example, in FIG. 3, where containers 9 are arranged in the container receiving spaces. The distance between the container receiving spaces is at least as large as a thickness of the frame arrangement 4 on the longitudinal sides 14 of the container stacking spaces 2. Accordingly, loading or removing the containers 9 into or from the container stacking spaces 2 is possible without a movement of the containers 9 into or out of the container stacking spaces 2 being hindered by the frame arrangement 4.

As can be seen in FIG. 3, the container receiving spaces are of a height which corresponds to the height of at least two containers 9, 9b; 9a, 9c stacked on top of one another. If the loading vehicle 10 is designed to be higher in the direction of gravity, stacks of more than two containers 9, 9a, 9b, 9c can also be accommodated in the container receiving spaces. In the exemplary embodiment shown in FIG. 3, the loading vehicle 10 can transport a total of four containers 9, 9a, 9b, 9c.

FIG. 4 shows a situation in which a stack of two containers 9, 9b has been lifted, e.g., in order to introduce this stack of two containers 9, 9b into a container stacking space 2 in one movement, or to remove the two containers 9, 9b from the container stacking space 2 in one movement. An adjacent container 9a is held in a position where it is located directly below the frame arrangement 4 so that, as soon as the loading vehicle 10 has reached the desired position below a container stacking space 2, said adjacent container can be introduced into the container stacking space 2.

As mentioned above, the two lifting units 12, 1.3 can also be synchronized with one another so that they can raise or lower a larger container 17 together. Here too, it is possible to transport two containers 17, 17a in the form of a stack together on the loading vehicle 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block storage arrangement comprising:
   a plurality of container stacking spaces;
   a loading space arranged below the container stacking spaces; and
   at least one loading vehicle configured to be moved in the loading space and having at least two lifters that are configured to be operated independently of one another, each of the at least two lifters with which containers are configured to be loaded from below into a container stacking space and can be removed from below from the container stacking space;
   a container holder arranged between each container stacking space and a loading space;
   wherein the loading vehicle for each lifter has an actuator acting on the container holder; and
   wherein each actuator has at least one beam which is configured to move in a direction from the loading space to a container stacking space, the beam having two actuators arranged at a distance from one another.

2. The block storage arrangement according to claim 1, further comprising:
   a controller connected to the lifters; and
   the controller comprises a synchronizer.

3. The block storage arrangement according to claim 1, wherein:
   the beam has a top side and a bottom side; and
   a distance between the top side and the bottom side changes over the length of the beam.

4. The block storage arrangement according to claim 1, wherein:
   each actuator is arranged on an end wall element of the loading vehicle.

5. The block storage arrangement according to claim 1, wherein:
   each container stacking space has a center axis, and each of the lifters has a center point in a plane perpendicular to a direction of gravity; and a distance between the center points of the lifters corresponds to a distance between the center axes.

6. The block storage arrangement according to claim 1, wherein:
   each lifter has a container receiving space that is rectangular in plan view and has a longitudinal side and a transverse side, which is shorter than the longitudinal side; and
   the longitudinal sides of adjacent lifters are arranged adjacent to one another.

7. The block storage arrangement according to claim 6, wherein:
   a frame is arranged between the loading space and the container stacking spaces; and
   adjacent container receiving spaces are at a distance from one another, which is at least as large as a thickness of the frame on the longitudinal sides.

8. The block storage arrangement according to claim 6, wherein:
   a plurality of additional containers are arranged in the container stacking spaces; and
   the container receiving spaces are of a height corresponding to a height of at least two of the additional containers stacked on top of each other.

* * * * *